March 3, 1936. S. S. GRIFFIN 2,032,477
FRUIT JUICE EXTRACTOR
Original Filed Oct. 8, 1931  2 Sheets-Sheet 1
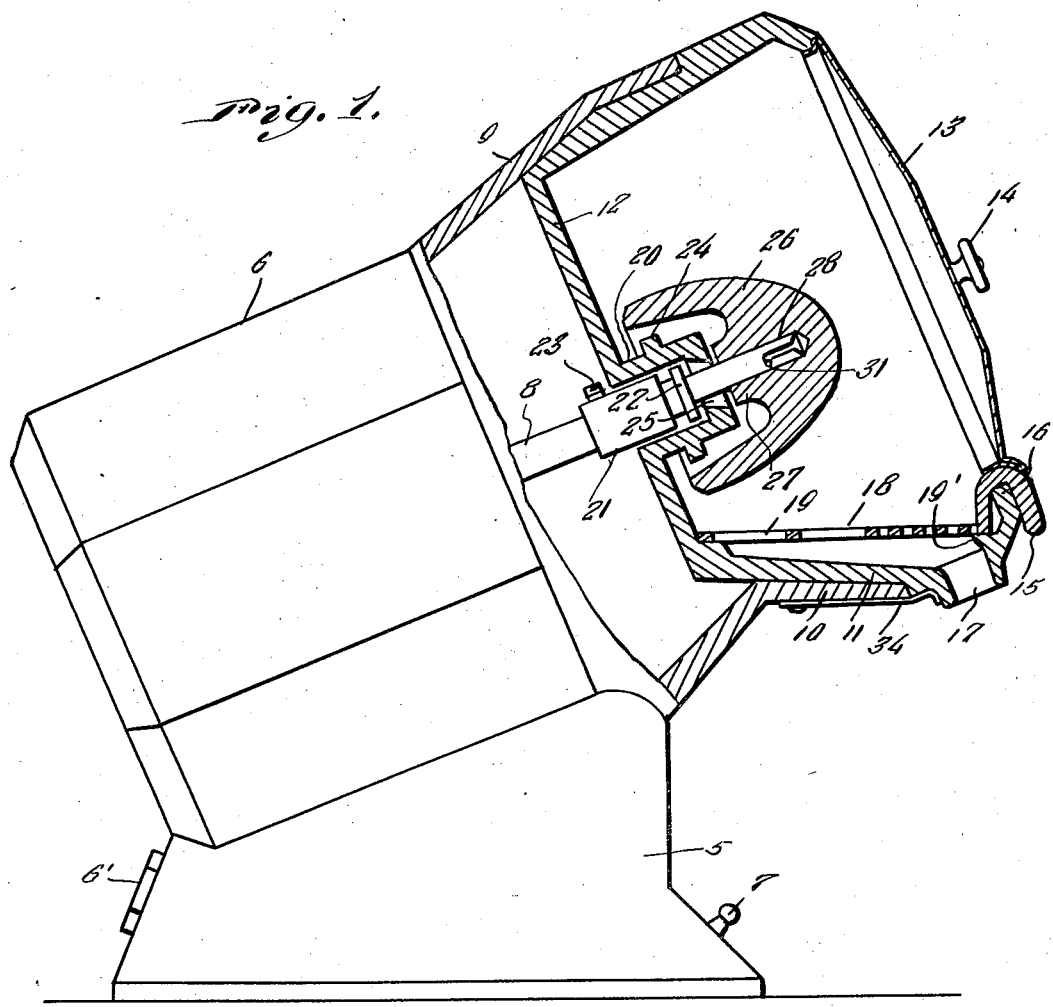
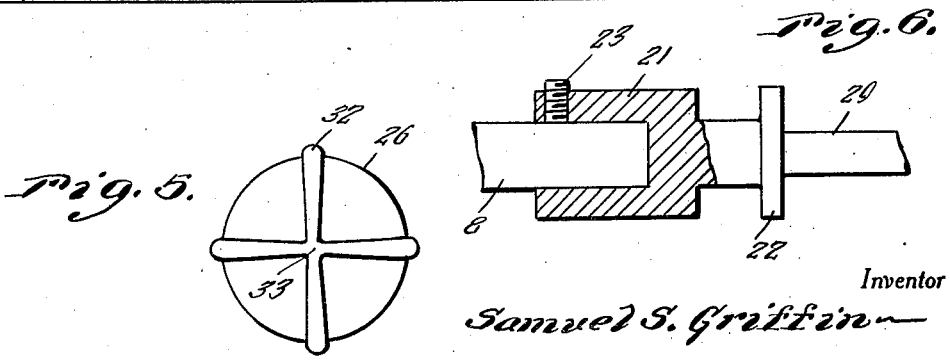
Inventor
Samuel S. Griffin
By Clarence A. O'Brien
Attorney March 3, 1936.   S. S. GRIFFIN   2,032,477
FRUIT JUICE EXTRACTOR
Original Filed Oct. 8, 1931   2 Sheets-Sheet 2
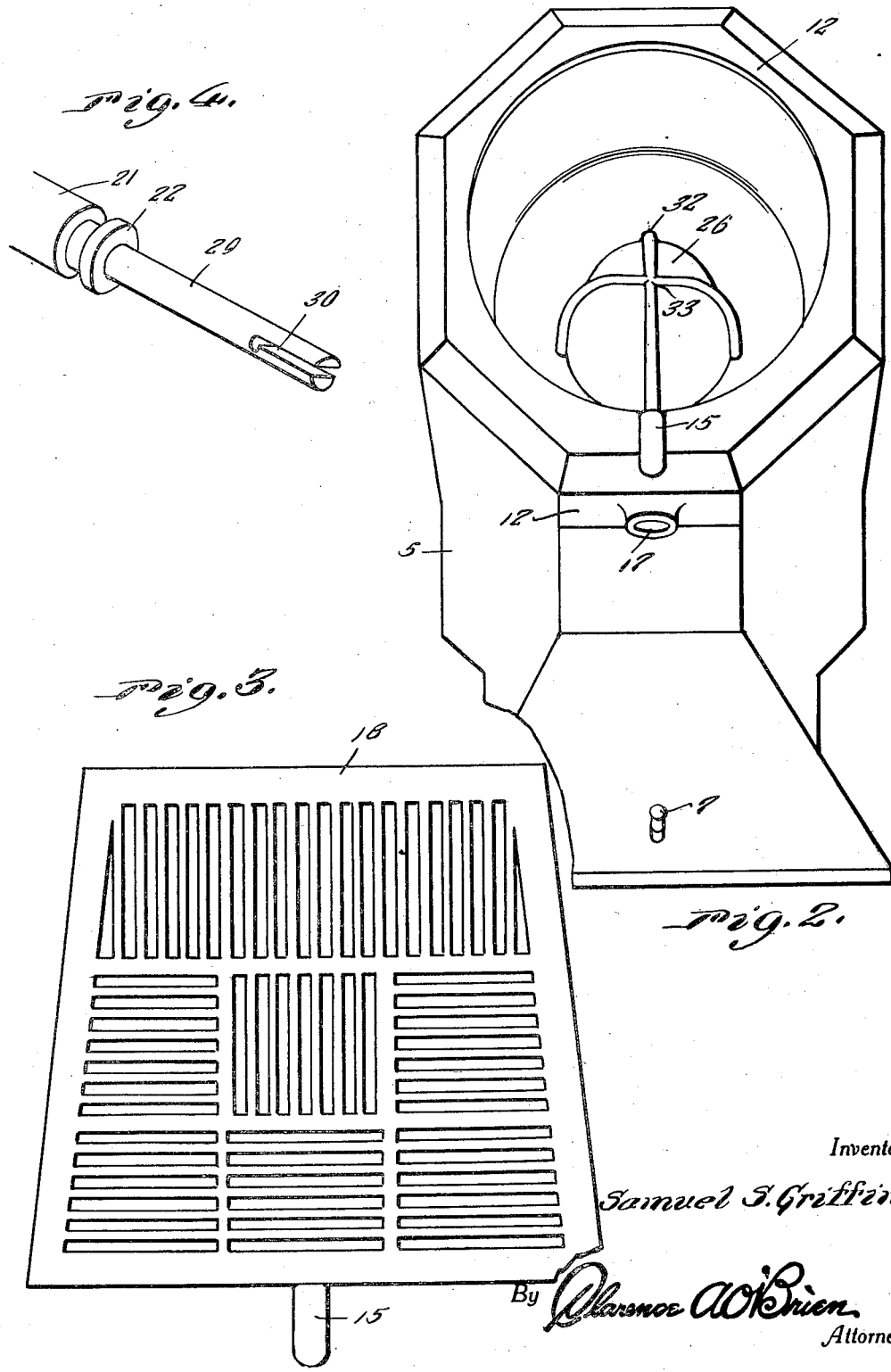
Inventor
Samuel S. Griffin
By Clarence A. O'Brien
Attorney Patented Mar. 3, 1936

2,032,477

UNITED STATES PATENT OFFICE 2,032,477

FRUIT JUICE EXTRACTOR

Samuel Stanley Griffin, Orlando, Fla.

Refiled for abandoned application Serial No. 567,733, October 8, 1931. This application November 12, 1935, Serial No. 49,421

3 Claims. (Cl. 146—3)

This application is a refile for abandoned application Serial No. 567,733, filed October 8, 1931.

This invention appertains to useful improvements in juice extractors especially adapted for extracting juice from citrous fruits.

The principal object of this invention is to provide an extractor wherein the rotary element is placed in a slanting position to enable the juice extracted to drain more readily and to permit cleaning of the rotary element more easily.

Other important objects and advantages of the invention will become apparent from the following specification and drawings.

In the drawings:—

Figure 1 is a side elevational view of the device partly broken away to disclose in section, certain details of construction.

Figure 2 is a front elevational view of the front of the device.

Figure 3 is a front elevational view of the front of the device.

Figure 4 is a perspective view of the upper end of the drive shaft.

Figure 5 is a front end elevational view of the rotary element.

Figure 6 is a fragmentary detailed sectional elevational view of the drive shaft.

Referring to the drawings wherein like numerals designate like parts, the numeral 5 designates the base upon which the angularly arranged motor housing 6 is supported. The base 5 has an electrical supply connection socket 6, and a switch 7 to start and stop the motor.

The electric motor, (not shown in the drawings) contained in the motor housing 6 is disposed in axial alinement in the housing 6 and its shaft or the shaft of such reduction gearing (not shown) as may be used, projects upwardly from the motor housing into the bowl receiving portion 9. The lower part of the bowl receiving portion 9 is provided with a horizontally disposed shelf 10 for supporting the horizontal portion 11 of the bowl 12.

The outer end portion of the horizontal part 11 of the bowl 12 is provided with a spout equipped drain opening 17. Outward of the spout the part 11 of the bowl is upwardly extended as indicated at 16. Within the bowl and adjacent to and below the portion 16 is an interior ledge 19' which acts as a support for the front end portion of a removable strainer grating 19 whose opposite end is supported on another ledge in the bowl so that the strainer grating is held in spaced relation to the horizontal portion 11 of the bowl. A hook-shaped lip 15 on the front end of the strainer grating engages over the extended portion 16 of the bowl and is disposed to be used as a handle for conveniently handling the strainer grating when removing it or replacing it in the bowl 12.

The "bottom" of the bowl 12 is provided with an opening surrounded by an upwardly disposed cylinder 20 within which operates the cylindrical shaped extension shaft 21 having the circumferentially extending flange 22 thereon at its forward end portion. This shaft 21 is provided with an axial opening to receive the upper end of the motor or reducing gear shaft 8 which is secured therein by a set screw 23. The outside of the cylinder 20 is provided intermediate its ends with a flange 24, shown in Fig. 1. The upper and closed end of the cylinder 20 is provided with an opening 25 whose axis is disposed at an angle to the axis of the shaft structure approaching the horizontal.

The rotor 26 is shaped like half of an egg and is interiorly cut away to define the hub formation 27 which has axially extended thereinto the socket 28 to receive the shaft extension 29 on the shaft 21. This shaft extension 29 is provided with a bayonet slot 30 in the upper end thereof for receiving the transversely extending pin 31 in the socket 28 of the rotor.

Obviously by slightly turning the rotor in the reverse direction, the pin 31 can be removed from the bayonet slot in the shaft and the rotor then easily removed from the drive shaft 29. The rotor 26 is provided with radial, longitudinally extending ribs 32 which converge at the pole 33 of the rotor.

The numeral 34 designates a leaf spring clip attached to the underside of the portion 11 for engaging a portion of the bowl 12 so as to prevent accidental displacement thereof. The opening of the bowl 12 may be closed by the cover 3 provided with the handle 14. Peripheral flanges on the cover are provided for seating with the edges of the opening in the bowl and over the hook shaped flange 15, 16 of the strainer grating.

To remove the bowl 12 from the device it is necessary, that the rotor 26 be first removed.

Obviously, the described construction, enables the device to be readily taken apart for repair and replacement of parts with little loss of time and difficulty.

While the foregoing specification sets forth the invention in specific terms, it is to be understood that changes in shape, size and materials may be resorted to without departing from the spirit and scope of the invention as claimed hereinafter.

What is claimed is:—

1. A fruit juice extractor comprising a base, a short hollow vertical portion rising from the base, a relatively long generally cylindrical casing disposed on the upper end of the vertical portion acutely angulated with respect thereto and extending at each end beyond said vertical portion, motor means located in the angularly disposed casing, fruit juice extracting means, and fruit juice collecting means located on the elevated end of the said angularly disposed casing, connection means extending operatively between said motor means and said extracting means, strainer means in said collecting means, said strainer means having a portion extending therefrom, and cover means for the collecting means coacting with the said portion of the strainer means for retaining the strainer means when in position.

2. A fruit juice extractor comprising a base, a hollow generally cylindrical casing on the base whose axis is disposed at an angle approaching the horizontal, a portion of larger diameter on the upper end of the casing constituting a receptor, the lower wall of the receptor being generally horizontal, a bowl received in the receptor and resting upon the horizontal lower wall and extending therebeyond, that portion of the lower part of the bowl which extends beyond the horizontal lower wall of the receptor being provided with an inclined drain opening, a generally horizontal strainer grating supported on portions of the bowl in spaced relation to the lower portion of the bowl and the inclined drain opening, handle means on the strainer grating resting on the bowl outward of the drain opening and extending from the opening of the bowl, motor means within the cylindrical casing, a rotor shaft extending axially from the motor means through an opening in the bowl, and fruit reamer means detachably connected to the rotor shaft within the bowl.

3. A fruit juice extractor comprising a base, a hollow generally cylindrical casing on the base whose axis is disposed at an angle approaching the horizontal, a portion of larger diameter on the upper end of the casing constituting a receptor, the lower wall of the receptor being generally horizontal, a bowl received in the receptor and resting upon the horizontal lower wall and extending therebeyond, that portion of the lower part of the bowl which extends beyond the horizontal lower wall of the receptor being provided with an inclined drain opening, a generally horizontal strainer grating supported on portions of the bowl in spaced relation to the lower portion of the bowl and the inclined drain opening, handle means on the strainer grating resting on the bowl outward of the drain opening and extending from the opening of the bowl, motor means within the cylindrical casing, a rotor shaft extending axially from said motor means through an opening in the bowl, fruit reamer means detachably connected to said rotor shaft within the bowl, and spring means on the receptor engaging the lower portion of the bowl for releasably maintaining the bowl in the receptor.

SAMUEL STANLEY GRIFFIN.